US005671441A

United States Patent [19]
Glassen et al.

[11] Patent Number: 5,671,441
[45] Date of Patent: Sep. 23, 1997

[54] METHOD AND APPARATUS FOR AUTOMATIC GENERATION OF I/O CONFIGURATION DESCRIPTIONS

[75] Inventors: Steven Gardner Glassen, Wallkill; Marten Jan Halma, Poughquag; Eugene Paul Hefferon, Poughkeepsie; Francis Edward Johnson, Poughkeepsie, all of N.Y.

[73] Assignee: International Business Machines Corporation, Armonk, N.Y.

[21] Appl. No.: 346,642

[22] Filed: Nov. 29, 1994

[51] Int. Cl.⁶ .................................................. H01J 3/00
[52] U.S. Cl. ........................ 395/828; 395/821; 395/830; 395/836; 395/200.12; 395/200.2; 395/700; 395/800; 395/839; 395/858
[58] Field of Search ............................... 395/856, 857, 395/858, 862, 885, 828, 825, 182.02, 200.15, 830, 831, 838, 839, 200.13, 200.12, 670, 674, 700

[56] References Cited

U.S. PATENT DOCUMENTS

| | | | |
|---|---|---|---|
| 4,207,609 | 6/1980 | Luiz et al. | 364/200 |
| 4,604,685 | 8/1986 | Brown et al. | 364/200 |
| 4,697,232 | 9/1987 | Brunelle et al. | 395/308 |
| 4,812,968 | 3/1989 | Poole | 364/200 |
| 4,970,640 | 11/1990 | Beardsley et al. | 395/842 |
| 5,119,488 | 6/1992 | Takamatsu et al. | 395/575 |
| 5,197,069 | 3/1993 | Cook et al. | 395/842 |
| 5,297,262 | 3/1994 | Cox et al. | 395/325 |
| 5,301,323 | 4/1994 | Maeurer et al. | 395/650 |
| 5,325,492 | 6/1994 | Bonevento et al. | 395/308 |
| 5,414,851 | 5/1995 | Brice, Jr. et al. | 395/650 |
| 5,420,988 | 5/1995 | Elliott | 395/275 |
| 5,444,851 | 8/1995 | Woest | 395/200.1 |
| 5,465,355 | 11/1995 | Cook et al. | 395/200.15 |
| 5,517,670 | 5/1996 | Allen et al. | 395/850 |

OTHER PUBLICATIONS

IBM Technical Disclosure Bulletin, vol. 18, No. 7, Dec. 1975 entitled "Optimization of Computer Configurations" by J. M. Angiulli et al, pp. 2235–2238.

*Primary Examiner*—Jack B. Harvey
*Assistant Examiner*—Raymond N. Phan
*Attorney, Agent, or Firm*—Bernard M. Goldman

[57] ABSTRACT

Automatic machine methods and apparatus for determining which components of an I/O configuration are shared by other components of the configuration. The information can be obtained through the use of existing self-description facilities and unique identifiers. By noting which channel paths are used to obtain configuration-data records and examining the unique identifiers provided for each I/O items it can be determined which I/O devices are accessible through the same control unit, and which control units provide access to the same I/O device. Furthermore, by examining the unique identifiers provided, it can be determined which I/O subsystems and which control units or channel subsystems are accessible through the same dynamic switch and which dynamic switches provide access to the same I/O subsystem of channel subsystem. A programmable subchannel is provided to enable communication between a CEC and an electrically-connected I/O item not represented in the current I/O configuration description being used by the CEC. Without the programmed subchannel, the CEC cannot access any I/O item not represented in the CEC's current I/O configuration description.

17 Claims, 7 Drawing Sheets

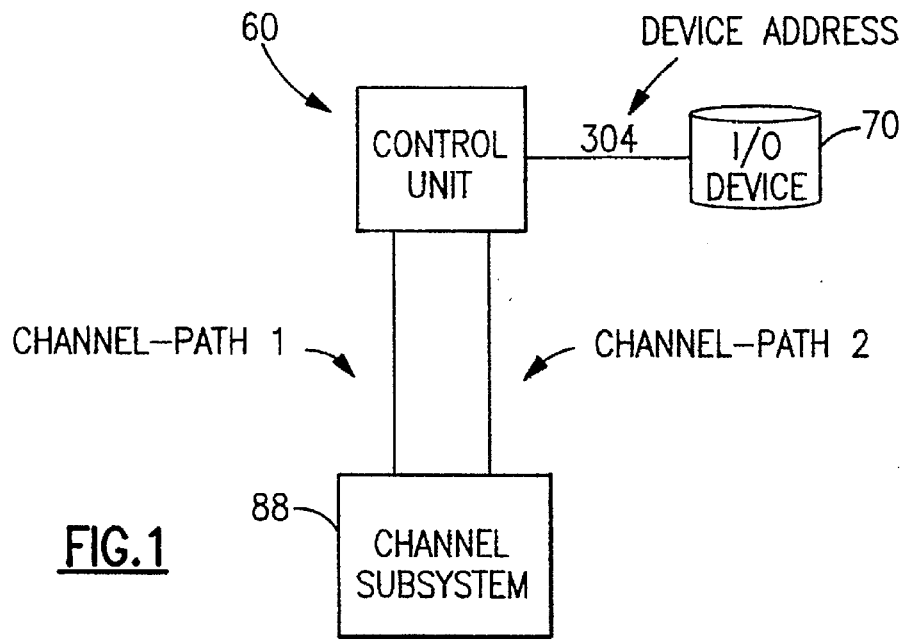
FIG.1 A CONTROL UNIT SHARED BY 2 CHANNEL PATHS.
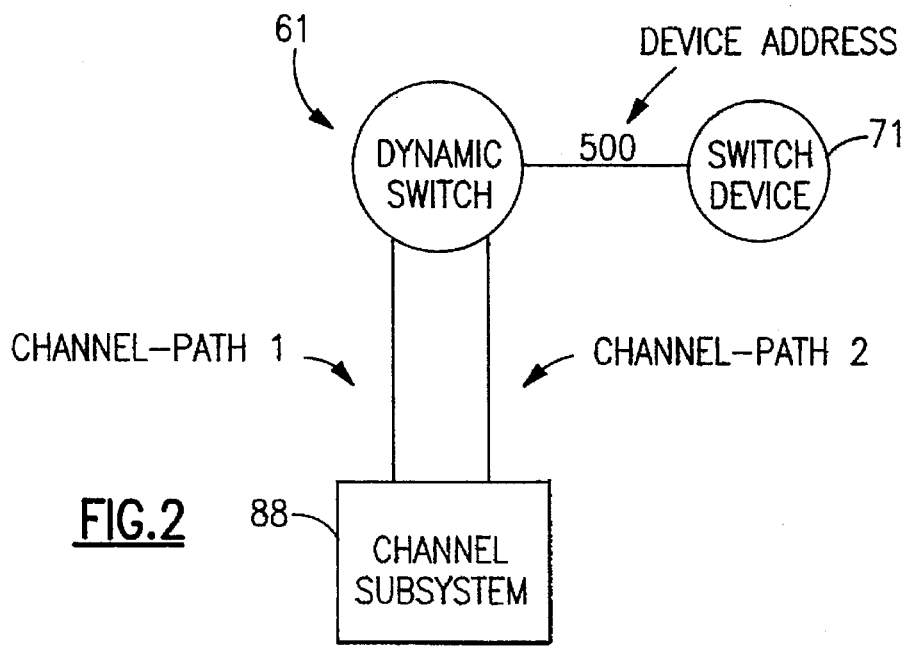
FIG.2 A DYNAMIC SWITCH SHARED BY 2 CHANNEL PATHS.

METHOD AND APPARATUS FOR AUTOMATIC GENERATION OF I/O CONFIGURATION DESCRIPTIONS

INTRODUCTION

This invention relates to methods and means for automatically identifying I/O components, such as dynamic switches, control units and other devices, shared by other I/O components which are attached to one or more computer systems.

BACKGROUND OF THE INVENTION

A large variety of I/O components, comprising I/O channels, switches, control units and devices, have proliferated in their connection to mainframe computer systems, such as the IBM S/360, S/370 and S/390 systems (and their compatibles). Presently, these I/O components can be connected in many different ways to the mainframe, forming a large variety of I/O system configurations. A side effect of this capability, however, has been that the customer had to provide a description of the particular system configuration to the operating system and the channel subsystem.

Additionally, some I/O components in a configuration are shared by a plurality of other I/O items. An I/O item is shared if the item can be accessed through multiple other I/O components. For example, an I/O control unit is shared if it can be accessed through two or more different I/O channels; these channels may be connected to the same or different computer systems. Another example is an I/O device (e.g. printer or disk) which is shared when it can be accessed through multiple control units, or if the device is connected to a single control unit which is shared by multiple channels.

Knowledge of the sharable state of each I/O component in a system configuration is important to enable a system to efficiently schedule shared items in a manner that avoids system delays due to conflicts among different programs attempting to use the items. The operating system and the channel subsystem have a number of reasons for knowing what I/O components in the system can be shared by two or more other I/O components in the configuration.

Specifically, there is a need to know when plural I/O subsystems (on a plurality of CECs) have I/O channels attached to (and share) the same dynamic switch, when plural I/O channels are attached to (and share) the same control unit, when plural dynamic switches are attached to (and share) the same I/O control unit, and when plural control units are attached to (and share) an I/O device. When a shared item is attached solely to another item, the other item may be accordingly shared in the same manner as its attached shared item.

Previously, the system user had to also provide the shared state of I/O items in each system configuration, manually. Usually, the user manually provided a description of the sharable state of each particular I/O item to the operating system software and to the I/O channel subsystem, in order for the programs executing on the systems to effectively and efficiently use the shared items. Such software tools as MVSCP have been used to describe the I/O items to the IBM MVS operating system, and IOCP to describe the I/O items to the I/O channel subsystem of a mainframe. The slowness of a manual effort has a significant cost to owners of such systems, and problems are created by a manual effort due to human errors made in such I/O item descriptions.

Furthermore, a need exists to allow programs to use I/O devices attached to, but not manually defined in, a configuration. Such a program must automatically determine the sharable and non-sharable I/O items attached to a system, determine the identity and characteristics of the items, and define all of these items formally to the I/O system. This need includes support for higher level automatic and semi-automatic I/O functions.

The IBM ESA/390 I/O architecture requires the use of internal control blocks to represent each I/O item attached to a system. They are internally coded control blocks that represent the I/O channels, switches, control units and devices. Some of these control blocks have special names, such as "subchannel" for a control block that represents an associated I/O device. A subchannel contains information about all connections which may be made to the represented I/O device, such as identifying its control unit(s) and all channel(s) through which the device may be connected to an I/O subsystem. The use of a subchannel allows the associated device to be asynchronously controlled by processor and device signals that are stored in the subchannel which acts as a buffer between the device and a program requesting the use of that I/O device. The subchannel and its associated configuration information is provided today through manual input to IOCP and/or the Dynamic I/O configuration process (prior art reference) and cannot be changed by program operation. The subchannel and its associated configuration information is provided today through manual input to IOCP and/or the Dynamic I/O configuration process (prior art reference) and cannot be changed by the program.

Plural internal control blocks are provided for each I/O component shared by more than one I/O subsystem—a separate internal control block is provided for each sharing I/O subsystem. Thus, if an I/O device can be accessed by more than one I/O subsystem, it has multiple subchannels—one in each connectable I/O subsystem.

But only one internal control block is provided for each I/O component shared within only one I/O subsystem. For example, a control unit may be shared (accessed) by multiple channels in the same I/O subsystem, or a device may be shared (accessed) by multiple control units in the same I/O subsystem.

The I/O components connectable to a system may be viewed as "nodes" in an interconnected graph structure, which in some systems may have very complex cross-connections and inter-connections in which any control unit, switch, or device may connect to one or more channel paths which may connect to one or more CEC I/O subsystems. When an I/O component is shared by multiple paths, the shared item usually can only be accessed through one of its multiple paths at a time.

A need exists to automatically identify and describe all shared items to each system using the item. Similarly, a means is needed to allow the program to perform I/O operations to devices that are not defined in the configuration. This is necessary in determining the identity and characteristics of the attached devices. This requirement is especially necessary to allow the program to support higher level functions such as Automatic or Semi-automatic I/O Configurations that cannot be dependent on predefined information.

The prior art has automatic methods that list each of a system's I/O components—channels, switches, control units and devices. However, no prior art is known to provide an automatic method for detecting all shared items in a system (all shared channels, shared switches, shared control units, and shared devices), and for identifying all paths doing the shared accessing of each shared item.

Some patents discussing I/O devices are as follows:

U.S. Pat. No. 5,119,488 teaches an interrupt control system having a plurality of access paths with a control memory for storing control information for controlling all of the access paths. When an error occurs on a path, a control unit assigned to the respective path refers to and updates the control memory to execute a channel reconnection without using the path on which the error has occurred, and then executes a retry command to carry out an error recovery operation.

U.S. Pat. No. 4,812,968 seems teach a method for controlling processor access to I/O devices to control unit and device lookout when a situation arises that the channel turn-around time becomes less than the device controller's housekeeping time.

U.S. Pat. No. 4,207,609 apparently discloses a method and means for path independent reservation and reconnection of devices to CPU's operating in a multi-CPU and shared device access system environment. I/O devices to control unit and device lookout when a situation arises that the channel turn-around time becomes less than the device controller's housekeeping time.

SUMMARY OF THE INVENTION

Accordingly, it is an object of the present invention to provide a method to detect sharing of I/O components in an I/O configuration, whether the I/O configuration is used by a single CEC or by more than one CEC in a loosely-coupled environment.

Another object of the present invention is to automatically and without any human intervention, detect all paths to each shared item so as to determine which attached I/O components are sharable by multiple channel paths in any I/O configuration available to the CEC.

A further object of the present invention is to provide a programmable subchannel which does not initially have a fixed configuration definition, but which can be programmed to assign, change and modify subchannel configuration information.

Yet another object of the present invention is to provide a method of identifying each device connected to the system by using a self-description facility provided in each I/O component which outputs a unique identifier for the component when queried with a request signal.

The subject invention provides an automatic way to determine all shared I/O items in an I/O subsystem of a CEC, and to describe to the subsystem all paths to each shared item. The invention uses a self-description ability provided in each I/O item which outputs a unique identifier for the item when queried with a request signal. Such identifier identifies the item because it is unique among all of the items connectable to a system, and in the extreme may be unique for all potential I/O component, e.g. each item provides a "world-wide unique identifier". Thus the invention eliminates the laborious and error-prone prior used manual methods of identifying I/O items.

The unique identifier is provided by each I/O item in the preferred embodiment of the invention from a self-description control block contained in, or associated with, each respective item. These control blocks may be known as node descriptors (NDs), associated node qualifiers (NQs), and as node-element descriptors (NEDs), and associated node qualifiers (NEQs). A self-description facility used with any item also includes read-configuration data, set-interface-identifiers, and read-node-identifier CCW commands and the store-node-identifier commands. The NDs, NQs, NEDs and NEQs are described in an IBM publication, SA22-7204, entitled "ESA/390 Common I/O Device Commands". Whenever an I/O item is accessed through a channel program the facility determines the status of the I/O item, and data in its associated NEDs is read back to the I/O subsystem and put into a data record in system memory at a predetermined location.

This invention is concerned with detecting sharing of each I/O item in an I/O configuration, whether the I/O configuration is used by a single CEC, or by multiple CECs in a loosely-coupled environment. In either case, the method of this invention is executed by a processor in each CEC attached to the I/O configuration.

For any CEC, the invention can automatically and accurately detect (without human intervention) which attached I/O items are sharable by multiple channel paths in the I/O configuration The method of this invention may be embodied in a program executed by a central processor (CPU) of a CEC needing to determine all shared I/O items in its attached I/O configuration. The invention initially detects each channel path available to the CEC. This may be done by attempting to access a channel for every possible channel identifier (CHPID) usable by a system, or by using a special instruction that obtains only the CHPIDs of the channel paths available to the CEC. The method collects the unique identifiers for each I/O item in the configuration—operating on one channel path at a time. All of the I/O item information required is collected after all items on all available channel paths have been accessed and their unique identifiers and other information collected in a central place. The method then determines from the collected information which I/O items are shared.

PROGRAMMABLE SUBCHANNEL

The subject invention additionally provides a programmable subchannel which allows the configuration data records of one or more (non-programmable) subchannels to be provided by the system independent of IOCP or any other manual input. The programmable subchannel does not have a fixed configuration definition, and therefore allows information about other I/O items to be stored. Associated with the subchannels is also a new instruction that may be used by the program to alter the programmable subchannel configuration information. Examples of information that may be changed within this programmable subchannel include CHPID, Link address, CU Image address, and possibly image ID. The subchannel provides (at least initially) only one path to a device. The process of programming the subchannel provides initiative on the I/ESCON interfaces, such as an ESCON interface, to establish or remove logical paths as appropriate. Once programmed with a configuration, normal I/O commands may be issued to the device to determine its presence and characteristics. This information may be gathered through the Common I/O item (device) command set, the Sense ID command and other I/O item (device) status information that is model independent.

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

BRIEF DESCRIPTION OF THE DRAWINGS

FIG. 1 is a possible configuration of the computer I/O system, showing two channel paths sharing a control unit, where the control unit is also connected to another I/O item in accordance with the present invention;

FIG. 2 is another possible configuration showing two channel paths sharing a dynamic switch attached to a switch device;

FIG. 5 is a flow chart showing the steps of methods used pertaining to methods and means for determining which components of I/O configuration are shared by other components of the configuration as described in the preferred embodiment.

A DETAILED DESCRIPTION OF THE INVENTION

Process For Determining a Shared Control Unit In FIG. 1.

Figure 5A:
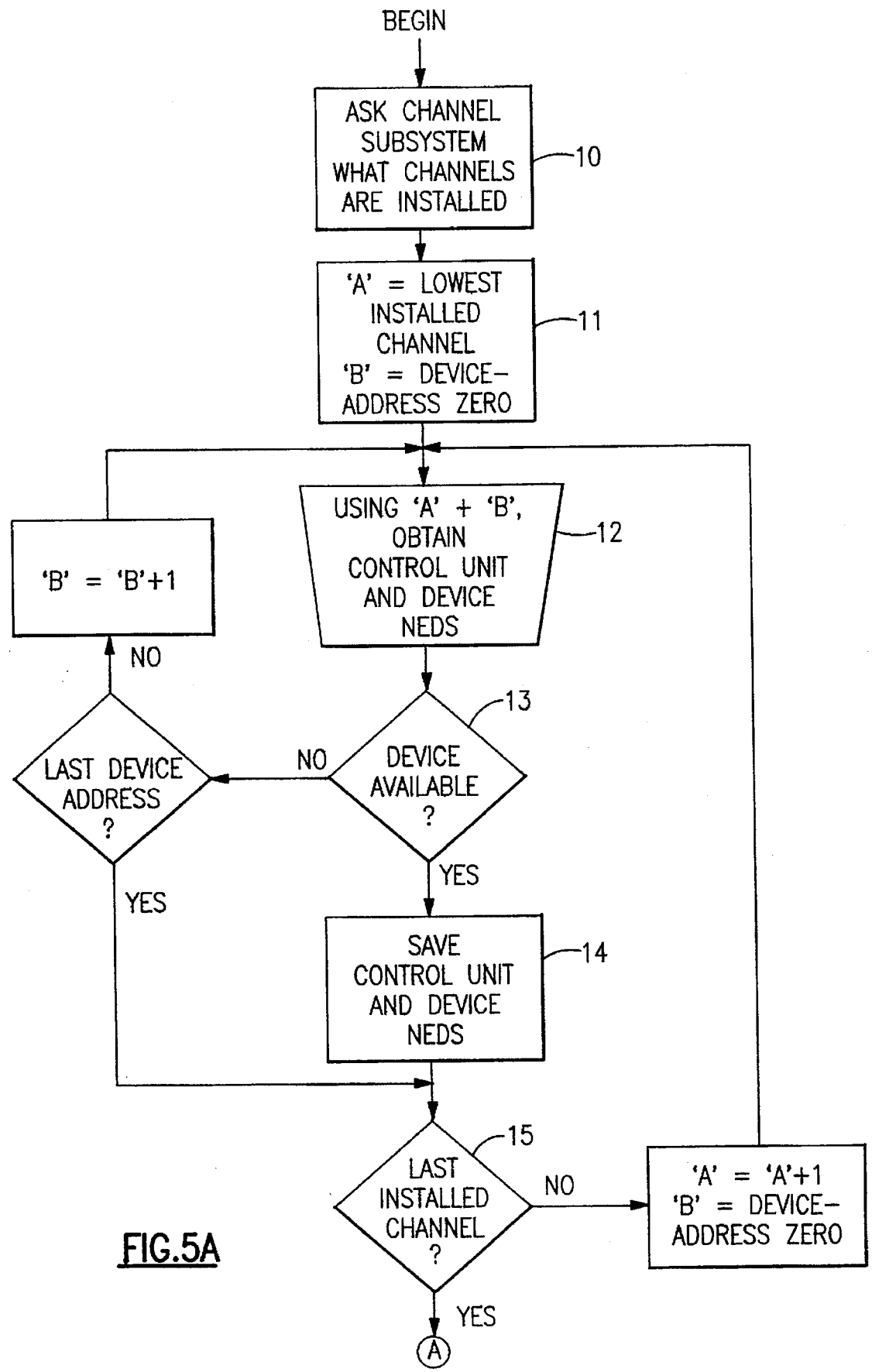
FIG. 5A shows a process for detecting the unique identifier information for all I/O items available to all control units connected to each installed channel in an I/O subsystem.
Figure 5B:
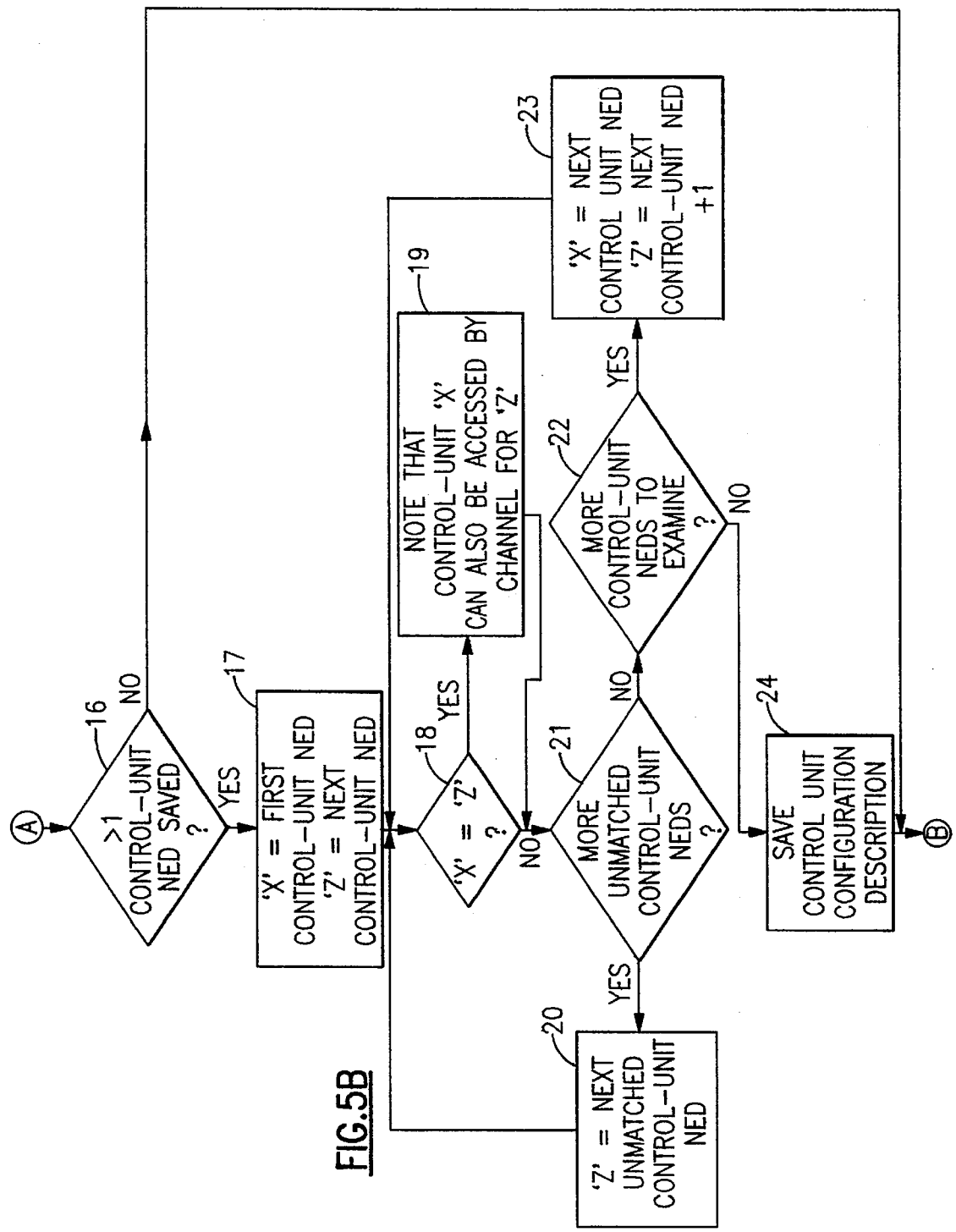
FIG. 5B shows a process for detecting the unique identifier information for all I/O control units available to each installed channel in an I/O subsystem.

A preferred embodiment is described by the process disclosed in FIGS. 5A and 5B, which is performed by a diagnostic computer program executing on a central processor (CPU) such as a processor in an IBM ES/9000 M 900 central electronic complex (CEC). The program includes instructions which control and obtain status of an I/O channel subsystem in the CEC through which I/O devices are connected to the CEC. In Step 10, the diagnostic program executes on a central processor of an IBM CEC which issues a channel-subsystem-call (CHSC) command to identify the channels recognized by the CEC's I/O subsystem. The identified channels are provided in a list stored in a main memory of the CEC, indicating all channel paths attached to a channel subsystem. That is, the execution of the CHSC command by a processor generates a list of the channel path identifiers (CHPIDs), and indicates the type (e.g. serial or parallel I/O) of each identified channel path. The CHSC command is in the prior art and has been previously used in IBM mainframes. CHSC commands have many different I/O status determining functions, such as those disclosed in U.S. patent application (P09-92-029) filed by Fredericks et al entitled "Pass-through for I/O channel subsystem call instructions" having Ser. No. 07/898875 filed on Jun. 15, 1992, and owned by the same assignee as the subject application.

Accordingly, step 10 generates in the CEC memory a list of all CHPIDs attached to the CEC's I/O subsystem. The list is a table having an entry for each identified channel, and a plurality of fields are provided for each entry in the table. Two of the fields in each entry contain the CHPID value and the channel type (e.g. serial or parallel I/O), respectively; and the other fields in each entry are empty. The table entries may be sorted by CHPID value.

Another way of performing step 10 (without using any CHSC type instruction) is to have a CPU execute a routine that contains instructions that test the status of each possible CHPID value from 0–255, for example, in a S/390 mainframe. An entry is validated in the CHPID table for each channel returning a valid status indication, and the returned channel type is entered in the entry.

In next Step 11, the program accesses the entry having the lowest-valued CHPID and indicating the serial I/O type, copies the CHPID value in a memory field called "A", and copies the I/O-device address 0 in another memory field called "B" provided for each CHPID entry in the list in the CEC memory.

In Step 12, the program issues an instruction which causes the contents of fields A and B to be associated with a programmable subchannel in the channel subsystem. This association determines which channel path and I/O-device address will be used when a subsequent START SUBCHANNEL (SSCH) instruction specifying the programmable subchannel is issued by the program. The program does not need to supply the destination link address (a required entity to perform I/O on a serial-I/O channel path) associated with the channel path, because the channel subsystem determines this as part of channel initialization which has already occurred.

In Step 13, the program issues SSCH specifying the programmable subchannel and providing a channel program containing the read-configuration-data command to the channel subsystem. The channel subsystem initiates an I/O operation and passes the read-configuration-data command to the addressed I/O device. If the I/O operation is successful, the channel subsystem receives a configuration-data record (CDR) from the addressed I/O device which it stores in a program-designated location in main memory. The CDR contains 32-byte identifiers. If the addressed I/O device is that of a dynamic switch, the CDR contains a 32-byte identifier that uniquely identifies the dynamic-switch I/O device. If the addressed I/O device is not that of a dynamic switch, the CDR contains a 32-byte identifier that uniquely identifies the control unit that was used to receive the read-configuration-data command. Next, step 14 occurs.

If, in Step 13, the I/O operation is not successful and the maximum I/O-device address has not been used, the I/O-device address in field B is incremented by one and Steps 12 and 13 are performed again. This sequence is iterated until either the I/O operation in Step 13 is successful or the maximum I/O-device address has been used. In the latter case, the attempt to obtain a configuration-data record on the channel path that is currently associated with the programmable subchannel is abandoned and Step 15 occurs.

In Step 14, the program saves the unique 32-byte identifier of the control unit and the associated channel-path CHPID in a control-unit list to be used in Steps 16 through 23 or, if applicable, the program saves the unique 32-byte identifier of the dynamic-switch I/O device and the associated channel-path CHPID in an I/O-device list to be used in Steps 25 through 32. Step 15 occurs.

In Step 15, the program examines the CHPID information obtained in Step 10 and determines if there are any remaining installed channel paths that have not been used to perform the operations in Steps 12, 13, and 14. If there exist such channel paths, the program places the lowest numbered CHPID associated with these channel paths in the A field, an I/O-device address of zero in the B field and Step 12 occurs. If no such channel paths exist, Step 16 occurs.

In Step 16, the program examines the list of unique identifiers and CHPIDs that were saved in Step 14 for control units. If there are two or more unique identifiers in the list, Steps 17 through 23 occur. Otherwise, Step WW occurs.

In Steps 17 through 23, the program compares each of the unique identifiers in the control-unit list with the remaining unique identifiers. When one or more identifiers match the identifier which is being used as an argument, the program records, in Step 19, the associated CHPIDs which identify all of the channel paths that can be used to access the same control unit.

The program has now detected which control units are attached to which channel paths, including all cases where control units can be accessed by two or more channel paths. (See FIG. 1.) The program, in Step 24, records this topology information for later use in the controlling of the performing I/O operations involving the use of control units.

Process For Determining The Shared Dynamic Switch In FIG. 2.

Figure 5C:
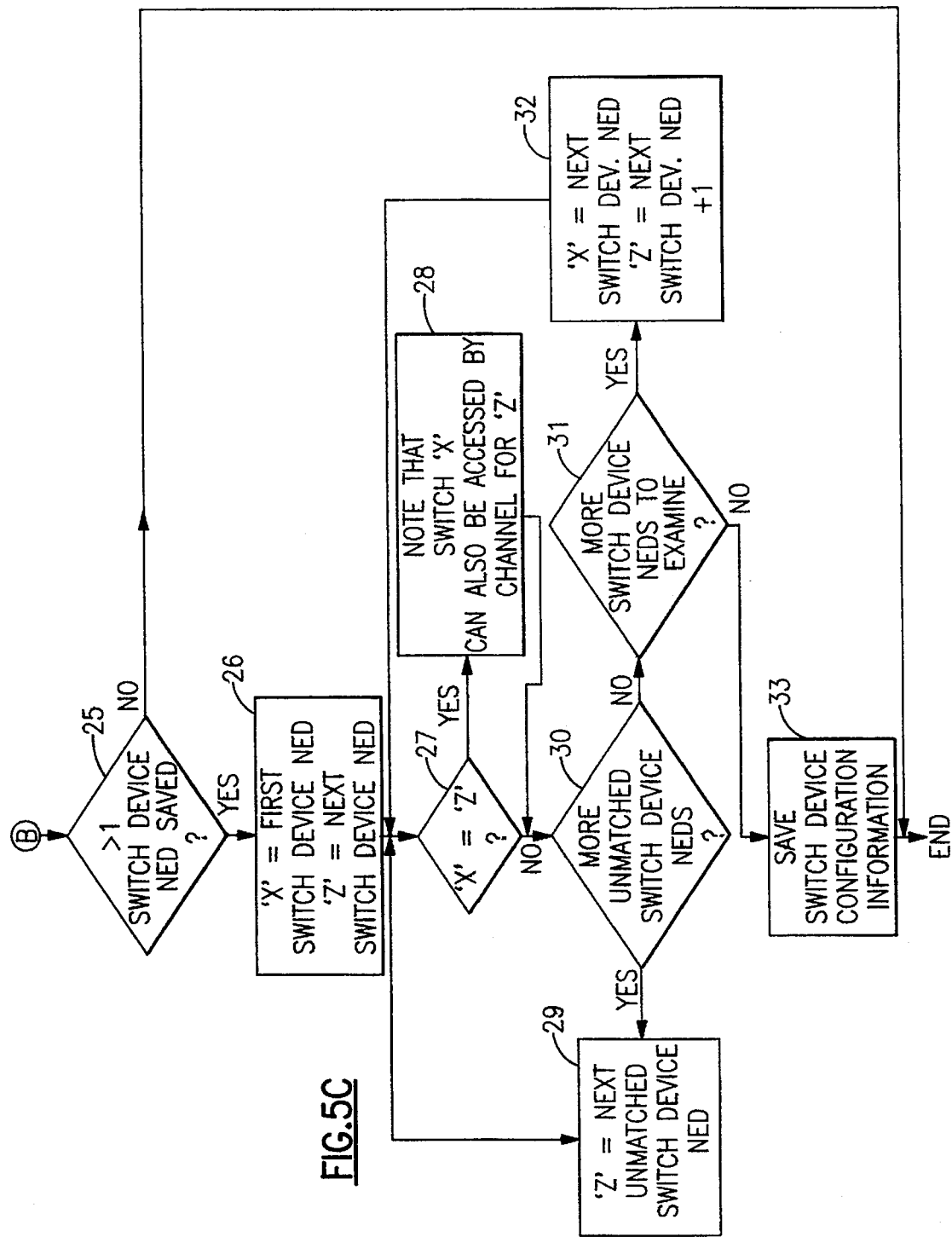
FIG. 5C shows a process for detecting the unique identifier information for all I/O dynamic switches available to each installed channel in an I/O subsystem.

The process is described by FIGS. 5A and 5C. The process begins at the top of FIG. 5A and finishes at the bottom of FIG. 5C. The description of Steps 10 through 15 in FIG. 5A is identical for this process to the description of those Steps for the process for determining the shared control unit in FIG. 1 above. Having recorded (if applicable) the topology information for control units in Step 24, Step 25 occurs.

In Step 25, the program examines the list of unique identifiers and CHPIDs that were saved in Step 14 for dynamic-switch I/O devices. If there are two or more unique identifiers in the list, Steps 26 through 32 occur. Otherwise, the process is ended.

In Steps 26 through 32, the program compares each of the unique identifiers in the dynamic-switch I/O device list with the remaining unique identifiers. When one or more identifiers match the identifier which is being used as an argument, the program records, in Step 28, the associated CHPIDs which identify all of the channel paths can be used to access the same dynamic switch.

The program has now detected which dynamic switches are attached to which channel paths, including all cases where dynamic switches can be accessed by two or more channel paths. (See FIG. 2.) The program, in Step 33, records this topology information for later use in the controlling of the performing I/O operations involving the use of dynamic switches.

Figure 3:
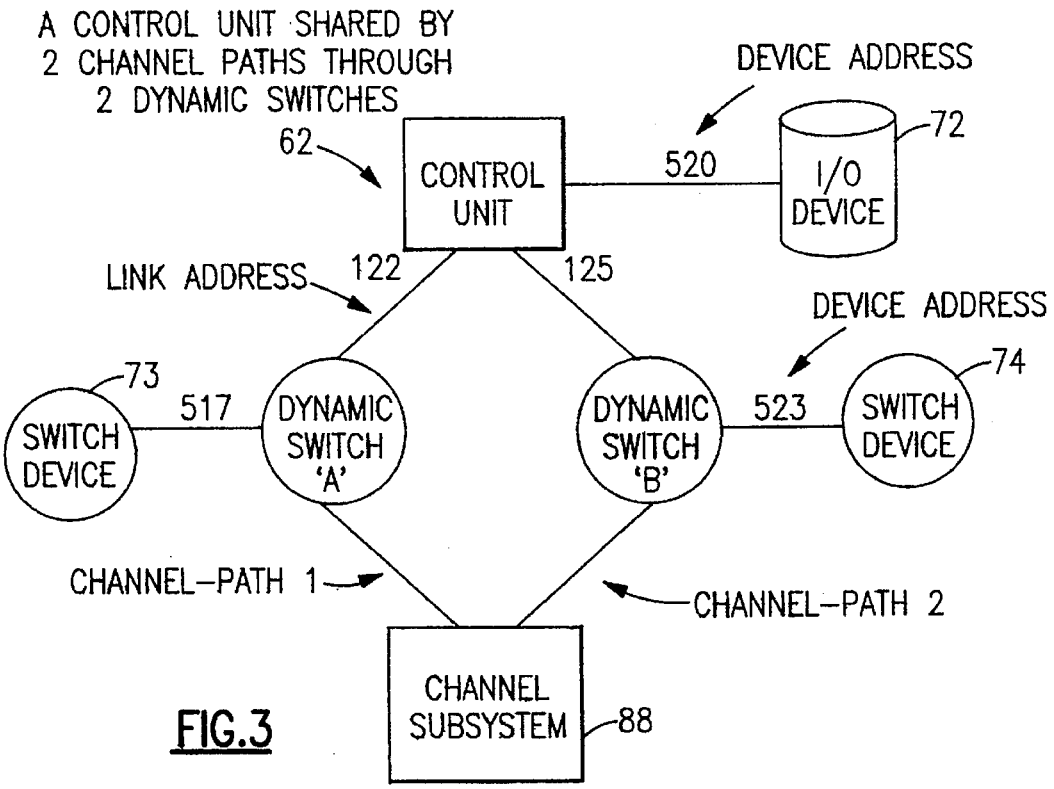
FIG. 3 is another possible system configuration showing a control unit shared by two channel paths through two dynamic switches.
Figure 4:
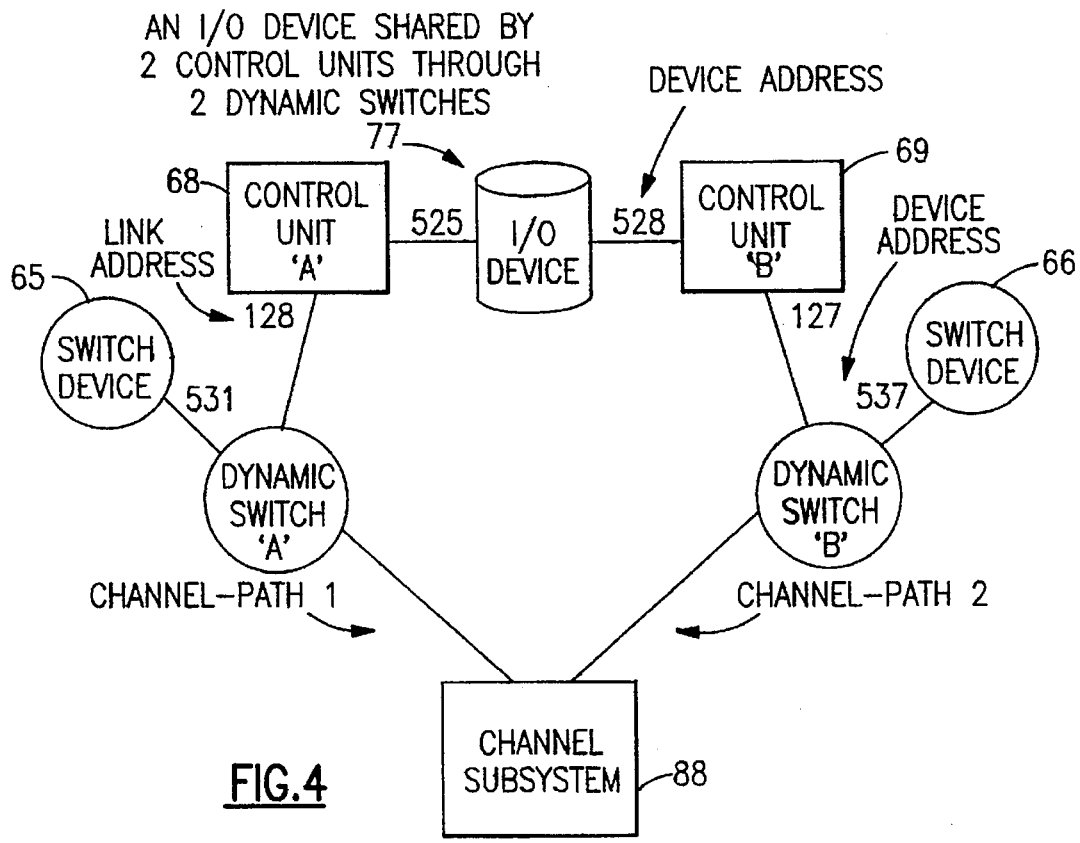
FIG. 4 is another possible system configuration showing an I/O item shared by two channel paths through two dynamic switches.

Process For Determining The Shared Control Unit In FIG. 3 and The Shared I/O Device In FIG. 4.

Figure 6A:
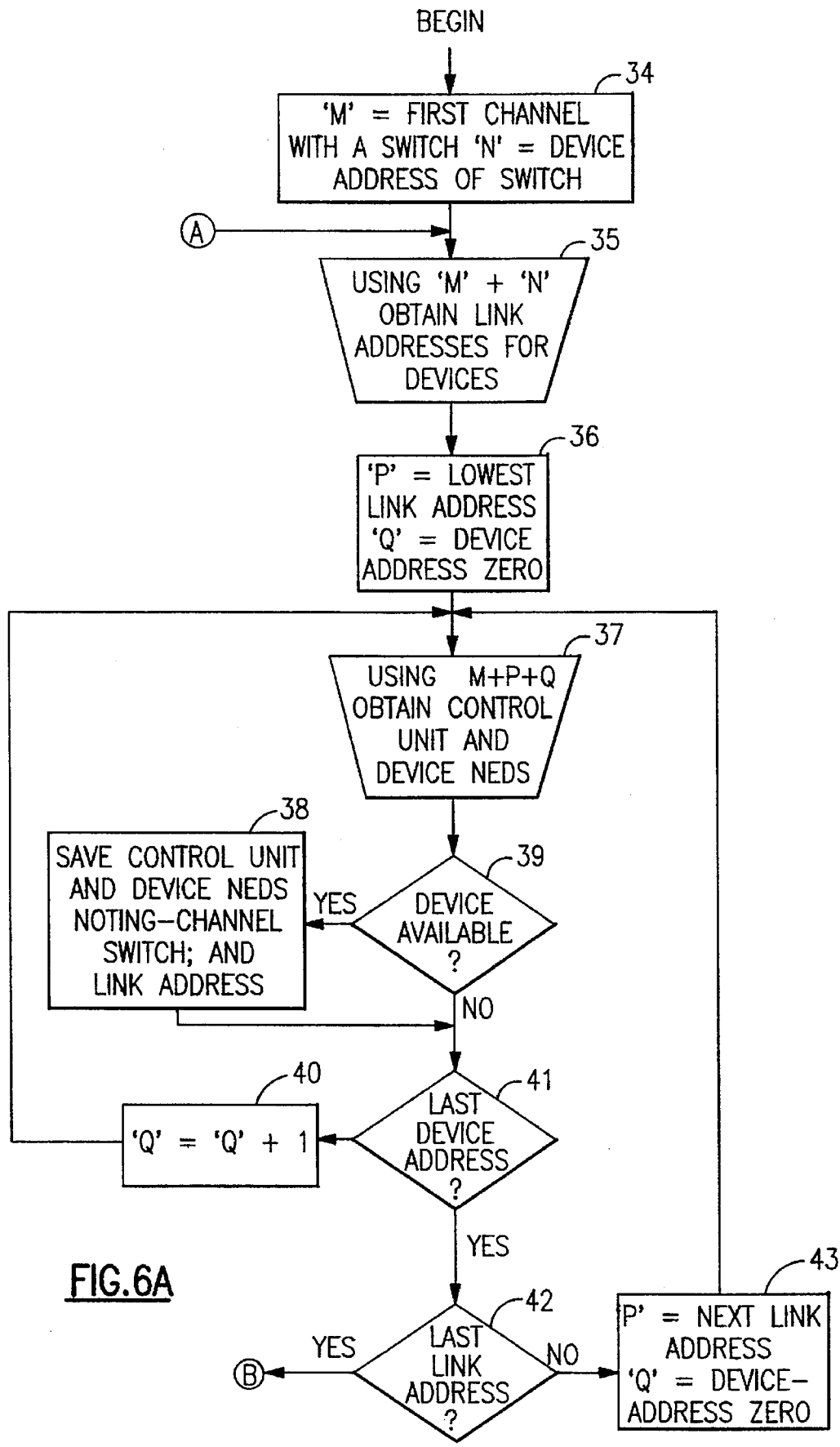
FIG. 6A shows a process for detecting the unique identifier information for all I/O control units and devices available to each.
Figure 6B:
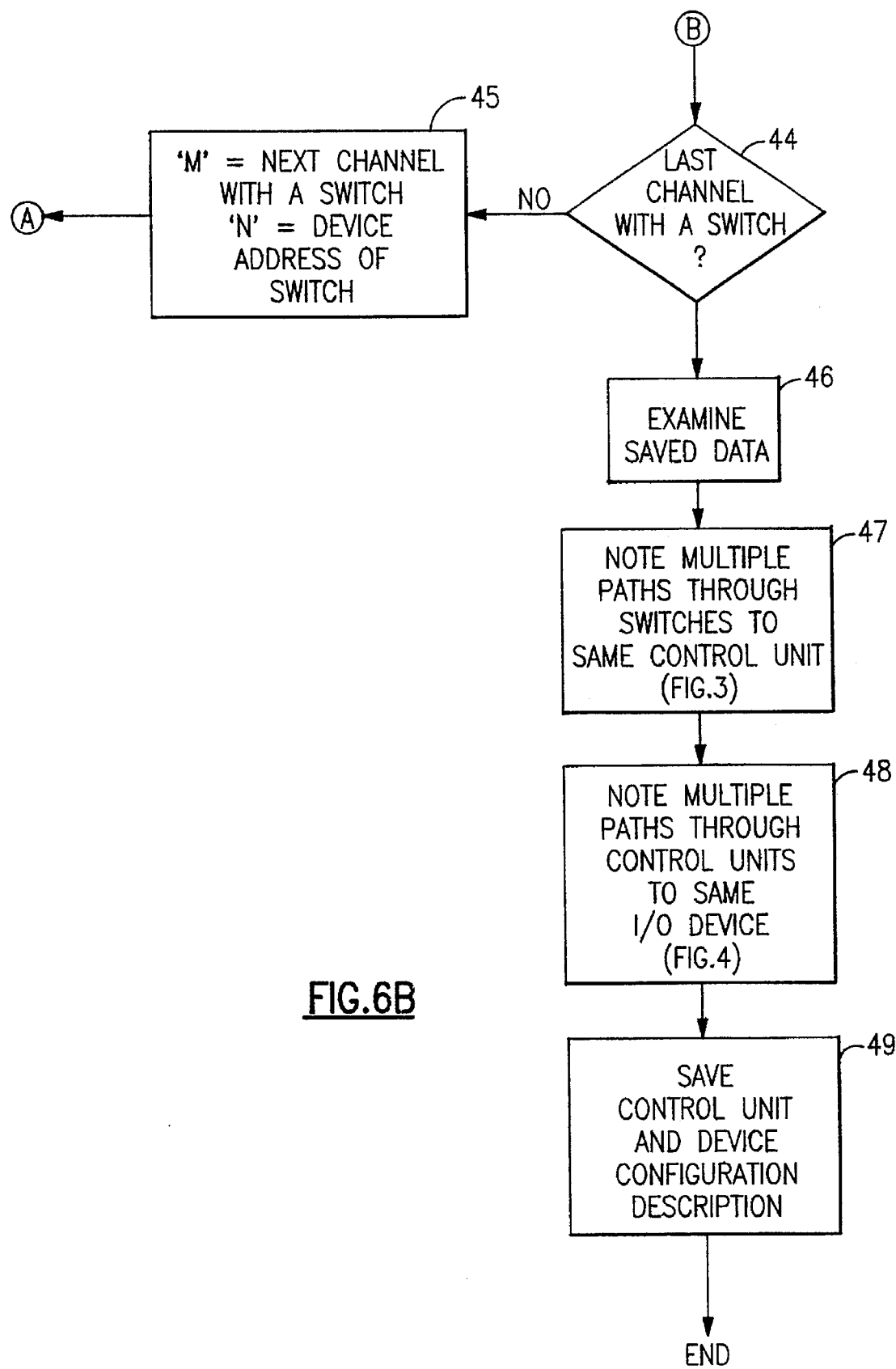
FIG. 6B show a process for determining shared items in an I/O subsystem configuration from the information obtained by the processes shown in FIGS. 5A, 5B, 5C and 5D.

The process is described by FIGS. 6A and 6B. The process begins at the top of FIG. 6A and finishes at the bottom of FIG. 6B.

Having used the processes for determining shared dynamic switches, the program is aware of the CHPID of at least one channel path to each dynamic switch, and the address of the dynamic-switch I/O device.

In Step 34, the program places the CHPID of the lowest numbered serial-I/O channel path of the first switch that was discovered in a field called "M," and the address of the dynamic-switch I/O-device for that switch in a field called "N." The program issues an instruction which causes the contents of fields M and N to be associated with a programmable subchannel in the channel subsystem. This association determines which channel path and dynamic-switch I/O-device address will be used when a subsequent START SUBCHANNEL (SSCH) instruction specifying the programmable subchannel is issued by the program.

In Step 35, the program issues SSCH specifying the programmable subchannel and providing a channel program containing the read-switch-port-information command to the channel subsystem. The channel subsystem initiates an I/O operation and passes the command to the addressed dynamic-switch I/O device. The channel subsystem receives a record from the dynamic-switch I/O device which it stores in a program-designated location in main memory. The record contains information about each of the ports of the dynamic switch, including the link address of each port.

In Step 36, the program places the lowest link address obtained in Step 35 in a field called "P" and an I/O device address of 0 in a field called "Q." The program issues an instruction which causes the contents of fields M, P, and Q to be associated with a programmable subchannel in the channel subsystem. This association determines which channel path, link address, and I/O-device address will be used when a subsequent START SUBCHANNEL (SSCH) instruction specifying the programmable subchannel is issued by the program.

In Step 37, the program issues SSCH specifying the programmable subchannel and providing a channel program containing the read-configuration-data command to the channel subsystem. The channel subsystem initiates an I/O operation and passes the read-configuration-data command to the addressed I/O device. If the I/O operation is successful, the channel subsystem receives a configuration-data record (CDR) from the addressed I/O device which it stores in a program-designated location in main memory. The CDR contains a 32-byte identifier that uniquely identifies the control unit that was used to receive the read-configuration-data command, and a 32-byte identifier that uniquely identifies the addressed I/O device. The program saves, in Step 38, the control-unit identifier in a list to be examined in Steps 46 and 47, and the I/O-device identifier in a list to be examined in Steps 46 and 48.

Step 41 tests whether the maximum I/O-device address has been used to obtain unique identifiers. If it has been used, Step 42 occurs. Otherwise, in Step 40, the I/O-device address in field Q is incremented by one, the program issues an instruction which causes the contents of fields M, P, and Q to be associated with a programmable subchannel in the channel subsystem, and Step 37 is performed again.

Step 42 tests whether the highest link address obtained in Step 35 has been used to obtain unique identifiers. If it has been used, Step 44 occurs. Otherwise, in Step 43, the program places the next link address in field P, I/O-device address 0 in field Q, the program issues an instruction which causes the contents of fields M, P, and Q to be associated with a programmable subchannel in the channel subsystem, and step 37 is performed again.

Step 44 tests whether there are any dynamic switches in the I/O configuration that have not been used to obtain unique identifiers from attached I/O devices. If not, Step 46 occurs. Otherwise, in Step 45, the program places the CHPID of a channel path to which the next dynamic switch is attached in field M, the I/O-device address of the dynamic-switch I/O device in field N, the program issues an instruction which causes the contents of fields M and N to be associated with a programmable subchannel in the channel subsystem, and Step 35 is performed again.

In Steps 46 and 47, the program examines the list of unique identifiers for dynamic switches and unique identifiers of control units that are attached to them. The program notes all cases where two or more dynamic switches have a control unit with the same unique control-unit identifier attached. (See FIG. 3.)

In Steps 46 and 48, the program examines the list of unique identifiers for control units and unique identifiers of I/O devices that are attached to them. The program notes all cases where two or more control units have an I/O device with the same unique I/O-device identifier attached. (See FIG. 4.)

The program has now detected which I/O-devices are attached to which control units and which control units are attached to which dynamic switches. The program, in Step 49, records this topology information for later use in the controlling of the performing I/O operations involving the use of control units and I/O devices.

PROGRAMMABLE SUBCHANNEL

The programmable subchannel is an invention that allows one or more subchannels to be provided by the system independent of IOCP or any other manual input. The program can identify these subchannels through a new Subchannel Type field provided in the SCHIB. The programmable subchannel does not have a fixed configuration definition. Associated with the subchannels is a new CHSC instruction that may be used by the program to alter the subchannel configuration information. Examples of information that may be changed within the subchannel include CHPID, Link address, CU Image address, and possibly image ID. The subchannel provides (at least initially) only one path to a device. The process of programming the subchannel provides initiative on the ESCON interface to establish or remove logical paths as appropriate. Once programmed with a configuration, normal I/O commands may be issued to the device to determine its presence and characteristics.

This information may be gathered through the Common I/O device command set, the Sense ID command and other device status information that is model independent.

Some other characteristics of the programmable subchannel are as follows:

Other CHSC instructions already exist which allow the program to determine the characteristics of the CSS and its associated Channel Paths, these may be used as assists to gain the necessary information to program the subchannel.

This present definition does not allow the programmable subchannel to be defined to a CHPID which is not defined.

The sense ID command is a command that all control units must honor independent of their characteristics and provides an unambiguous indication of the control units ability to honor the common I/O device command set.

Execution of the Sense ID command or any command in the common I/O device command set may be executed with a set of device configuration defaults known to the channel subsystem.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

Having thus described our invention, what we claim as new and desire to secure by Letters Patent is:

1. A method in a computer system with a central electronics complex (CEC), having at least one I/O channel subsystem, a plurality of channel paths and a plurality of I/O items, said I/O items being attachable to said subsystem via said channel paths in different ways as to provide a plurality of different system configurations, the method performed by the CEC for accessing information associated with said I/O items, said method comprising the following CEC-performed steps:

structuring in the CEC an amorphous subchannel not defined in a current I/O configuration definition for the I/O channel subsystem, using the amorphous subchannel to test for the existence of each I/O item connected to one or more channel paths of said CEC by simulating a plurality of I/O item addresses by the amorphous subchannel without the CEC using the current I/O configuration definition for accessing the I/O item, attempting to access the I/O item addressed by the using step, determining characteristics of each of said I/O items by accessing self-description information provided for each of said I/O items;

determining the channel paths usable to access each of said I/O items;

storing the self-description information about said attached I/O items and storing information for each channel path connection to each I/O item in an I/O item configuration record;

examining said I/O item configuration record to determine if any of said I/O items are shared by said channel paths or said I/O items, and using said I/O item configuration record to build an I/O configuration definition, wherein the amorphous subchannel previously contained no fixed I/O configuration definition information, and allows information about said I/O items to be stored, modified, or retrieved when I/O commands are issued.

2. The method of claim 1, wherein said self-description information provided by each of said I/O items has a unique identifier including type and distinguishing characteristics of said I/O item.

3. The method of claim 1 wherein said amorphous subchannel is a programmable subchannel used to contain parameters to enable use of the programmable subchannel for obtaining self-description information from I/O items; and said programmable subchannel having no fixed I/O configuration definition of its own.

4. The method of claim 1, wherein each of said channel paths has a channel identifier (CHPID) usable by said CEC; and information exits about which CHPIDs are usable by said CEC.

5. The method of claim 1, wherein said I/O items and their channel paths are located by executing a program.

6. The method of claim 1, wherein I/O items are tested using the entire range of device addresses for a single link destination address and a single channel address, prior to testing a next link destination address, wherein the entire range of link destination addresses are tested prior to testing a next channel path address until all channel path addresses have been tested.

7. The method of claim 3 wherein an information gathering step is performed during which said parameters in said programmable subchannel are used to select each I/O item from which information is to be retrieved; and said information gathering step also using said parameters to enable the use of said programmable subchannel to determine if said I/O item is a dynamic switch or a control unit.

8. The method of claim 3, wherein said I/O items honor a Sense ID command independent of any type of I/O item.

9. The method of claim 3, wherein said programmable subchannel is programmed, and I/O commands are issued to each I/O item to determine presence and characteristics of each I/O item.

10. The method of claim 2, wherein said unique identifier provided by each of said I/O items provides information about a node at which point said I/O item is attached to each of said channel paths;

said unique identifier identifying said node by the use of a plurality of node descriptors (NDs), a plurality of associated node qualifiers (NQs), a plurality of node-element descriptors (NEDs), and a plurality of associated node qualifiers (NEQs); and said self-description information being retrieved by a plurality of commands to read said configuration data, set a plurality of interface identifiers, and read and store a node identifier.

11. In a computer system with a central electronics complex (CEC), a plurality of subchannels and a plurality of connected I/O items, a programmable subchannel initially having no fixed I/O configuration definition, said programmable subchannel being capable of containing parameters and being independent of an I/O configuration program (IOCP), said programmable subchannel further comprising:

a storage location for storing configuration information about a plurality of I/O items;

said configuration information being usable to establish logical paths which enable the CEC to use said I/O items; and means for allowing information about said I/O items to be stored, modified, or retrieved when I/O commands are issued.

12. The programmable subchannel of claim 11, wherein a said programmable subchannel is identifiable by said system by a special type field provided in a subchannel information block (SCHIB) within said programmable subchannel.

13. The programmable subchannel of claim 11, containing addressing information for routing data between a CEC-resource logical partition and an I/O item.

14. The programmable subchannel of claim 11, wherein after said programmable subchannel contains configuration information, I/O commands are issued to said I/O item to determine presence and characteristics of said I/O item.

15. A mechanism for locating I/O items and their associated channel paths in a Central Electronic Complex (CEC) of a computer system, said mechanism comprising:

at least one channel subsystem attaching said I/O items via said channel paths in different ways to provide a plurality of different system configurations;

self-description information being provided by each of said I/O items;

means for collecting data associating said I/O items with channel paths;

means for collecting characteristics information for said I/O items;

said storage location, a storage location for storing a configuration description indicating a plurality of I/O items and their characteristics and their attachment to said channel subsystem by channel paths, wherein said mechanism does not depend on any prior fixed I/O configuration definition in the system, and means for using said storage location to build an I/O configuration definition.

16. The mechanism of claim 15, further comprising means for examining said configuration description for determining if any of said I/O items share any of said channel paths, and if any of said channel paths share said I/O items.

17. The mechanism of claim 15, wherein each of said I/O items provide a unique identifier including type and characteristics of said I/O item;

each of said I/O items provides self-description information about a node by the use of a node descriptor (ND), a plurality of associated node qualifiers (NQs), a plurality of node-element descriptors (NEDs), and a plurality of associated node-element qualifiers (NEQs); and said CEC including a plurality of commands to read said configuration description, set a plurality of interface identifiers, and read and store a node identifier associated with each of said I/O items.

* * * * *